May 17, 1955  R. F. LEWIS  2,708,435
HUMIDIFIER
Filed April 9, 1954　　　　　　　　　　　　　　　3 Sheets-Sheet 1
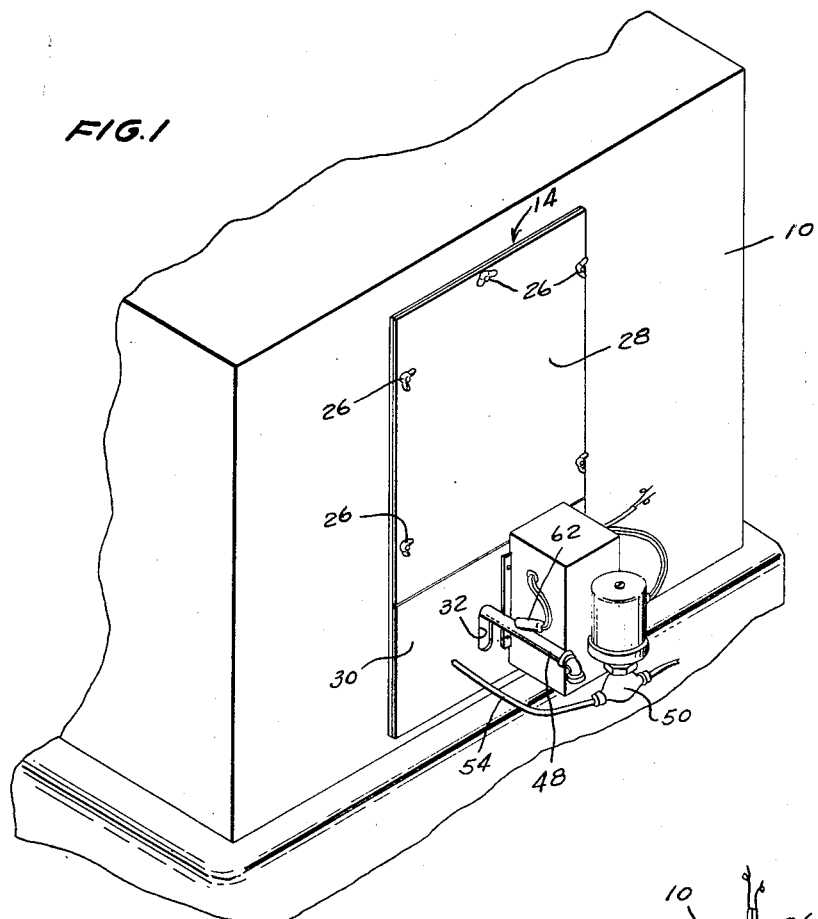
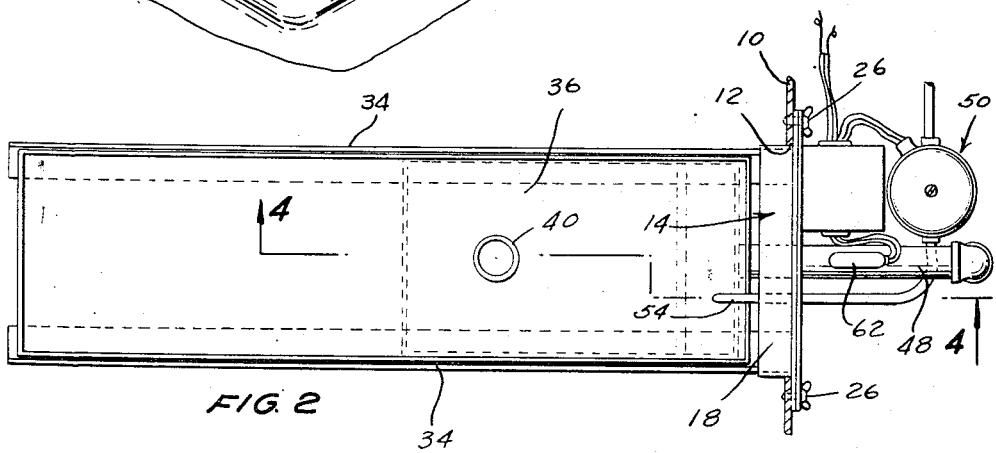
INVENTOR.
RAYMOND F. LEWIS
BY
McMorrow, Berman & Davidson
ATTORNEYS

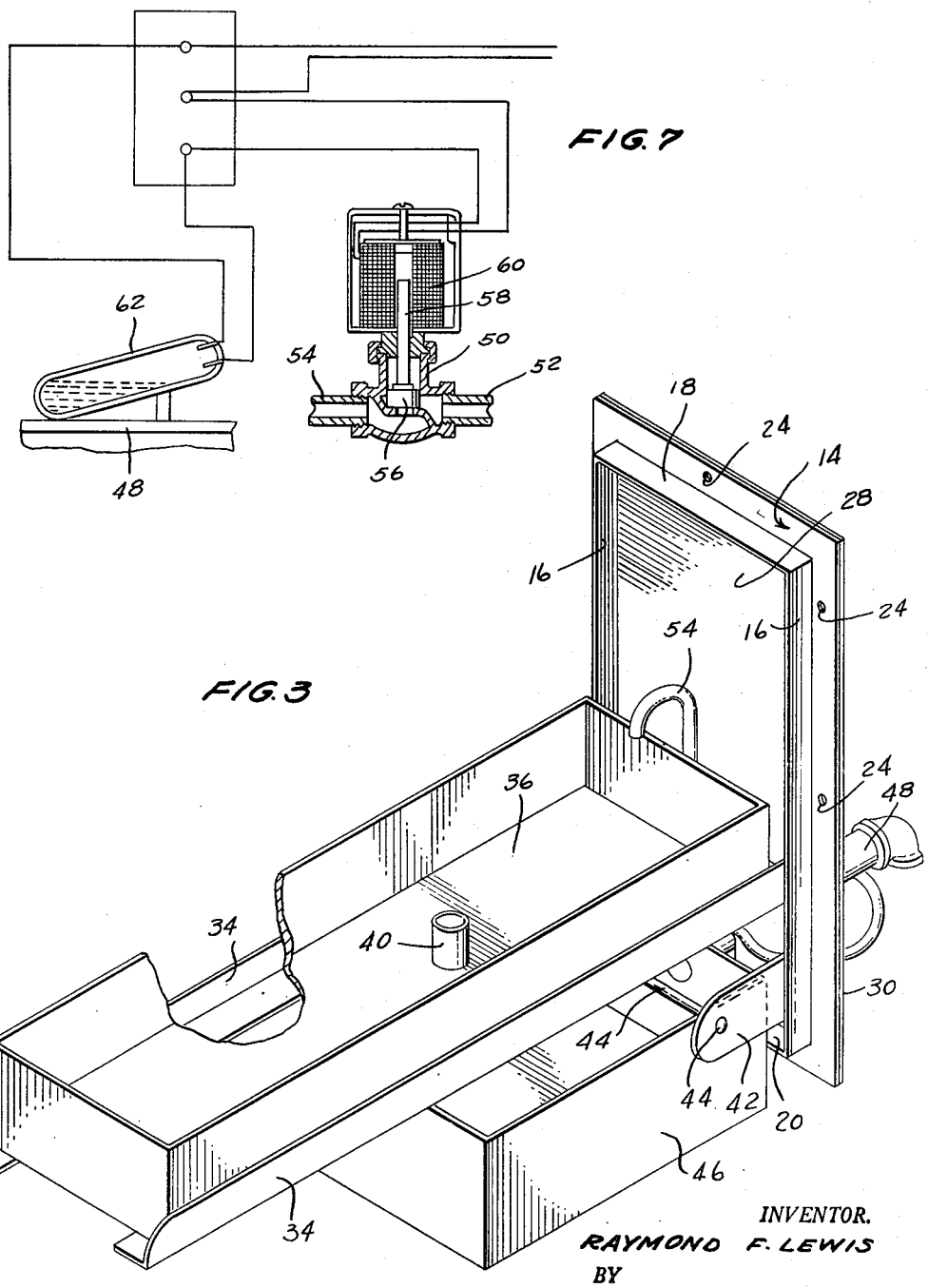

May 17, 1955  R. F. LEWIS  2,708,435
HUMIDIFIER
Filed April 9, 1954  3 Sheets-Sheet 3
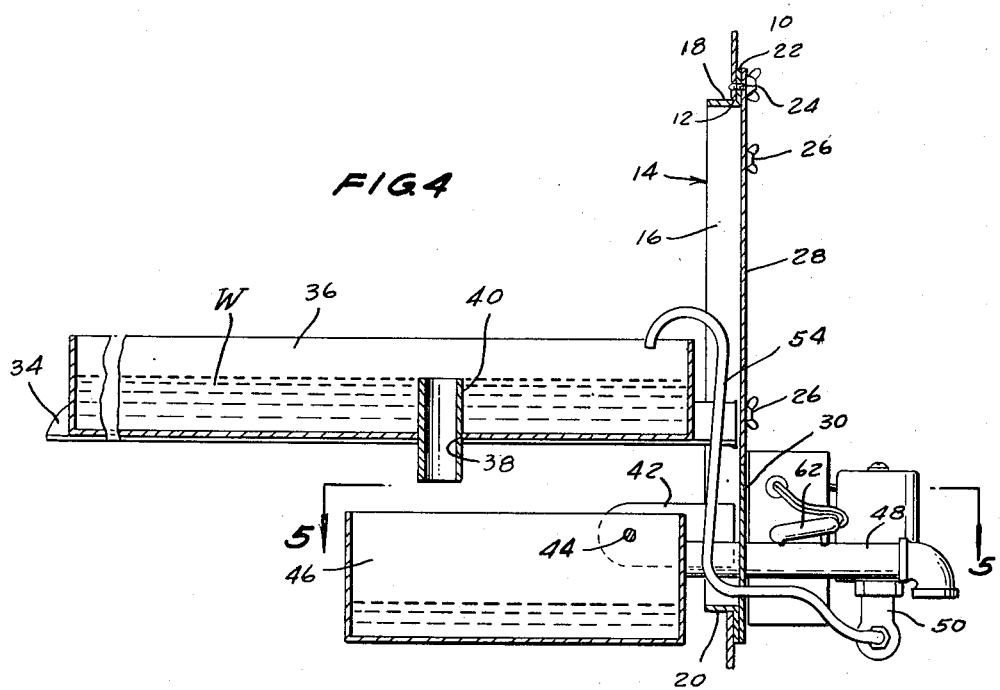
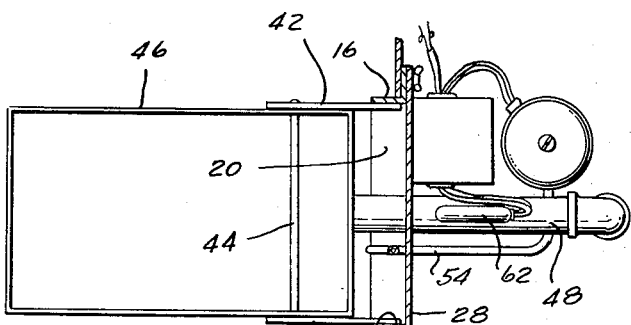
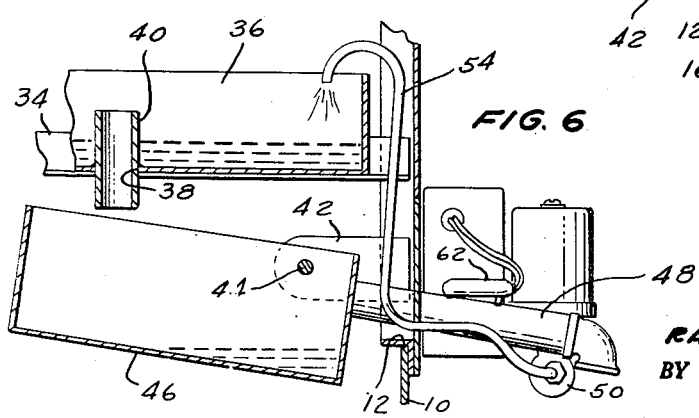
INVENTOR.
RAYMOND F. LEWIS
BY
McMorrow, Berman + Davidson
ATTORNEYS

United States Patent Office 2,708,435
Patented May 17, 1955

2,708,435

HUMIDIFIER

Raymond F. Lewis, Iowa City, Iowa

Application April 9, 1954, Serial No. 422,083

6 Claims. (Cl. 126—113)

This invention relates to a humidifier for a warm air heating unit and has for its primary object to supply moisture to air passing through the heating unit.

Another object is to facilitate the mounting of the humidifer on a conventional heating unit and to thereby enable heating units already installed to be equipped with automatically controlled moisture supply apparatus.

A further object is to maintain a constant supply of moisture to the air passing through the heating unit and to avoid the possibility of discontinuing the humidification of the air during the replenishment of the avaporated water.

The above and other objects may be attained by employing this invention which embodies among its features an evaporating tray mounted within a heating unit for introducing moisture into air passing therethrough, an overflow pipe carried by the evaporating tray and extending through the bottom thereof for discharging water therefrom after it has attained a predetermined level therein, a water supply pipe extending into the heating unit and having a discharge end disposed above the tray for directing a stream of water thereinto, a valve connected to the water supply pipe and to a source of water supply for controlling the flow of water through the water supply pipe, an overflow receiving pan mounted within the heating unit beneath the overflow pipe for movement under the influence of water discharged thereinto through said pipe, and means carried by the pan and operatively connected to the valve for closing it when the pan moves under the influence of water introduced thereinto through the overflow pipe.

Other features include a counterbalance carried by the pan and extending outwardly therefrom for moving it and opening the valve upon evaporation of the water within the pan.

Still other features include an electromagnetically controlled valve connected to the water supply pipe and a source of water supply for controlling the flow of water through the water supply pipe and a switch carried by the pan and electrically connected to a source of electrical energy and to the valve for closing the valve when the pan moves under the influence of water introduced thereinto through the overflow pipe.

Still other features include an overflow discharge pipe connected to the pan and extending through the casing of the heating unit for discharging outside of said heating unit any overflow from the pan, and said overflow discharge pipe serving as a counterbalance for the pan.

In the drawings:

Figure 1 is a perspective view of a heating unit equipped with this improved humidifier;

Figure 2 is a horizontal sectional view through the heating unit showing the humidifier in place therein;

Figure 3 is a perspective view of the humidifier, certain portions being broken away to more clearly illustrate certain details of the invention;

Figure 4 is a longitudinal sectional view taken substantially on the line 4—4 of Figure 2;

Figure 5 is a horizontal sectional view taken substantially on the line 5—5 of Figure 4;

Figure 6 is a fragmentary sectional view similar to Figure 4, showing the parts in another position; and Figure 7 is a wiring diagram showing the manner in which the valve is controlled.

Referring to the drawings in detail, a heating unit 10 is provided in one wall with an opening 12 for the reception of certain flanges of the frame of the humidifier, to be more fully hereinafter described.

The frame previously referred to is designated generally by the numeral 14 and comprises upwardly extending side bars 16 and horizontally extending top and bottom bars 18 and 20, respectively. The bars 16, 18 and 20 are preferably angle irons and carry outwardly extending flanges 22 which are provided at spaced points with openings 24 for the reception of attaching screws by means of which the humidifier is mounted on the casing 10 of the heating unit. Certain of the screws designated 26 take the form of thumb screws which secure an access door 28 to the frame 14 above a plate 30 which is welded or otherwise secured to the frame. As will be readily understood upon reference to the drawings, the plate 30 is provided with an opening 32 for a purpose to be more fully hereinafter explained.

Carried by the side bars 16 and extending into the interior of the heating unit 10 are spaced parallel horizontally extending supporting brackets 34 upon which is removably supported an evaporating tray 36 having an opening 38 extending through the bottom thereof through which extends an overflow pipe 40 which serves to maintain water W within the tray 36 at a predetermined level. Carried by the side bars 16 below the brackets 34 are spaced parallel horizontally extending arms 42 to which is pivotally connected as at 44 to rock about a common horizontal axis a pan 46, and carried by the pan 46 and extending outwardly through the opening 32 in the plate 30 is an overflow discharge pipe 48 which communicates with the interior of the pan 46 to discharge any excess water therein outside of the heating unit. As will be readily understood upon reference to the drawings, the pan 46 is disposed beneath the discharge end of the overflow pipe 40 so that any water drained from the tray 36 through the overflow pipe 40 will find its way into the pan 46 to tilt the pan about the horizontal axis against the effort of the overflow pipe 48 which serves as a counterbalance as well as an overflow pipe.

Mounted on the plate 30 on the side thereof remote from the heating unit 10 is an electromagnetically controlled valve 50 which is connected to a source of water supply 52, and has connected thereto a water supply pipe 54, the discharge end of which extends through the plate 30 and is disposed above the evaporating tray 36, as will be readily understood upon reference to Figures 4 and 6. The movement of the valve member 56 to closed position is controlled by gravity and to open position by an electromagnetically actuated core 58 which is surrounded by a coil 60. A conventional mercury switch 62 is mounted on the overflow discharge pipe 48 to move therewith, and this switch is electrically connected to a source of electrical energy (not shown) and to one terminal of the coil 60. The opposite terminal of the coil 60 is connected to a source of electrical energy (not shown) so that when the circuit is completed by the tilting of the mercury switch 62, the valve 50 will be opened to cause water to flow through the pipe 54 into the evaporating tray 36. Obviously, as the water level within the evaporating tray 36 reaches the upper end of the overflow pipe 40, water will be discharged through said pipe into the pan 46 which, when a predetermined volume of water has been received therein will rock about the horizontal axis to tilt the mercury switch 62 and break the electrical circuit through the coil 60, thus allowing the valve member 56 to move downwardly under the influence of gravity into engagement with the valve seat to close the valve and discontinue the flow of water from the source of water supply through the pipe 54.

In use, it will be evident that a suitable opening 12 is formed in the casing of the heating unit 10 to accommodate the frame 14 and with the frame in place in the furnace casing and the valve 50 connected with a source of water supply and with the coil 60 connected to a source of electrical energy along with the switch 62, it will be evident that upon energization of the coil 60 by the switch 62, the valve 50 will be opened to permit the flow of water from a source of water supply through the valve and into the pipe 54 from which the water is discharged into the evaporation tray 36 until it attains a predetermined level at which time any overflow is deposited in the pan 46 and the weight of the water in the pan overcoming the weight of the counterbalancing overflow discharge pipe 48 will tilt the pan about the horizontal axis so as to tilt the switch 62 into a position in which the electrical circuit through the coil 60 of the valve 50 is discontinued, thus permitting the valve to close and discontinue the flow of water through the pipe 54.

By using this device, it is obvious that even though the supply of water in the pan 46 becomes exhausted through evaporation, the water W remaining in the tray 36 will be sufficient to maintain the humidification of the air passing through the heating unit while the valve 50 is opened to enable the pipe 54 to discharge water into the tray 36 to replenish the supply thereof.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A humidifier for a warm air heating unit, said humidifier comprising an evaporating tray adapted to be mounted within a heating unit for introducing moisture into air passing therethrough, an overflow pipe carried by the tray and extending through the bottom thereof for discharging water therefrom after it has attained a predetermined level therein, a water supply pipe adapted to extend into the heating unit and having a discharge end disposed above the tray for directing a stream of water thereinto, a valve connected to the water supply pipe and to a source of water supply for controlling the flow of water through the water supply pipe, an overflow receiving pan mounted beneath the overflow pipe for movement under the influence of water discharged thereinto through said pipe, and means carried by the pan and operatively connected to the valve for closing it when the pan moves under the influence of water introduced thereinto through the overflow pipe.

2. A humidifier for a warm air heating unit, said humidifier comprising an evaporating tray adapted to be mounted within a heating unit for introducing moisture into air passing therethrough, an overflow pipe carried by the tray and extending through the bottom thereof for discharging water therefrom after it has attained a predetermined level therein, a water supply pipe adapted to extend into the heating unit and having a discharge end disposed above the tray for directing a stream of water thereinto, a valve connected to the water supply pipe and to a source of water supply for controlling the flow of water through the water supply pipe, an overflow receiving pan mounted beneath the overflow pipe for movement under the influence of water discharged thereinto through said pipe, means carried by the pan and operatively connected to the valve for closing it when the pan moves under the influence of water introduced thereinto through the overflow pipe, and a counterbalance carried by the pan and extending outwardly therefrom for moving it and opening the valve upon evaporation of the water in the pan.

3. A humidifier for a warm air heating unit, said humidifier comprising an evaporating tray adapted to be mounted within a heating unit for introducing moisture into air passing therethrough, an overflow pipe carried by the tray and extending through the bottom thereof for discharging water therefrom after it has attained a predetermined level therein, a water supply pipe adapted to extend into the heating unit and having a discharge end disposed above the tray for directing a stream of water thereinto, an electromagnetically controlled valve connected to the water supply pipe and a source of water supply for controlling the flow of water through the water supply pipe, an overflow receiving pan mounted beneath the overflow pipe for movement under the influence of water introduced thereinto, a switch carried by the pan for movement therewith, and said switch being electrically connected to a source of electrical energy and to the valve for closing said valve when the pan moves under the influence of water introduced thereinto.

4. A humidifier for a warm air heating unit, said humidifier comprising an evaporating tray adapted to be mounted within a heating unit for introducing moisture into air passing therethrough, an overflow pipe carried by the tray and extending through the bottom thereof for discharging water therefrom after it has attained a predetermined level therein, a water supply pipe adapted to extend into the heating unit and having a discharge end disposed above the tray for directing a stream of water thereinto, an electromagnetically controlled valve connected to the water supply pipe and a source of water supply for controlling the flow of water through the water supply pipe, an overflow receiving pan mounted beneath the overflow pipe for movement under the influence of water introduced thereinto, a switch carried by the pan for movement therewith, said switch being electrically connected to a source of electrical energy and to the valve for closing said valve when the pan moves under the influence of water introduced thereinto, and a counterbalance carried by the pan and extending outwardly therefrom for moving it and opening the valve upon evaporation of the water in the pan.

5. A humidifier for a warm air heating unit, said humidifier comprising an evaporating tray adapted to be mounted within a heating unit for introducing moisture into air passing therethrough, an overflow pipe carried by the tray and extending through the bottom thereof for discharging water therefrom after it has attained a predetermined level therein, a water supply pipe adapted to extend into the heating unit and having a discharge end disposed above the tray for directing a stream of water thereinto, an electromagnetically controlled valve connected to the water supply pipe and a source of water supply for controlling the flow of water through the water supply pipe, an overflow receiving pan mounted beneath the overflow pipe for movement under the influence of water introduced thereinto, a switch carried by the pan for movement therewith, said switch being electrically connected to a source of electrical energy and to the valve for closing said valve when the pan moves under the influence of water introduced thereinto, and an overflow pipe carried by the pan and extending outwardly therefrom to define a counterbalance for moving the pan and actuating the switch to open the valve upon evaporation of the water in the pan.

6. A humidifier attachment for a warm air heating unit, said attachment comprising a frame adapted to be mounted on the casing of a warm air heating unit in surrounding relation to an opening extending therethrough, a cover plate carried by the frame and extending across the lower end thereof, said cover plate having an elongated opening extending therethrough adjacent the lower end thereof, an evaporating tray carried by the frame and adapted to extend into the heating unit above the plate, said tray having an overflow pipe extending through the bottom thereof for discharging water therefrom after it has attained a predetermined level therein, an electromagnetically controlled valve carried by the plate on the side thereof remote from the evaporating tray and connected to a source of water supply, a water supply pipe connected to the valve and having its discharge end disposed above the tray for supply water thereto when the valve is open, arms carried by the frame and adapted to extend into the heating unit adjacent opposite sides of the frame, a pan mounted on the arms to rock about a horizontal axis beneath the overflow pipe for receiving water discharged therefrom, an overflow discharge pipe carried by the pan and extending outwardly therefrom and through the opening in the plate to discharge any overflow from the pan on the side of the plate adjacent the valve, said overflow discharge pipe defining a counterbalance for tilting the pan as water contained therein evaporates, a mercury switch carried by the overflow discharge pipe for movement therewith, said switch being electrically connected to a source of electrical energy and to the valve for opening and closing said valve in response to the tilting of the pan, and a door removably supported on the frame above the plate.

References Cited in the file of this patent

UNITED STATES PATENTS

| | | |
|---|---|---|
| 1,720,241 | Sallada | July 9, 1929 |
| 1,936,895 | Anetsberger | Nov. 28, 1933 |
| 2,573,158 | Muth | Oct. 30, 1951 |
| 2,588,567 | Perlman | Mar. 11, 1952 |